(12) United States Patent
Kaminaga (10) Patent No.: US 6,256,269 B1
(45) Date of Patent: Jul. 3, 2001

(54) RECORDING AND REPRODUCING APPARATUS CAPABLE OF DISPLAYING THE PRESENCE OR ABSENCE OF OPTICAL DISKS

(75) Inventor: Satoshi Kaminaga, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/533,106

(22) Filed: Mar. 22, 2000

(30) Foreign Application Priority Data

Mar. 24, 1999 (JP) .................................................. 11-080011

(51) Int. Cl.$^7$ .................................................. G11B 17/22
(52) U.S. Cl. .................................................. 369/34
(58) Field of Search .................................................. 369/33, 34, 35, 369/36, 37, 38, 39, 178

(56) References Cited

U.S. PATENT DOCUMENTS 5,446,714 * 8/1995 Yoshio et al. ......................... 369/48
5,864,522 * 1/1999 Sugano et al. ......................... 369/34
5,886,961 * 3/1999 Yamashita et al. ..................... 369/34
6,118,738 * 9/2000 Uehara .................................. 369/34

* cited by examiner

Primary Examiner—Tan Dinh
(74) Attorney, Agent, or Firm—Sughrue, Mion, Zinn, Macpeak & Seas, PLLC (57) ABSTRACT

A recording medium reproduction apparatus having a section for storing virtual storage position numbers, each indicating the virtual storage position of a recording medium, and recording medium presence/absence information, in correspondence with absolute storage position numbers indicating physical storage positions of a plurality of recording mediums. The storage positions of disks are virtually managed by utilization of the virtual storage position numbers. A disk can be virtually moved from one storage position to another storage position, by selection of a disk from among the disks stored in the housing through use of a button.

16 Claims, 11 Drawing Sheets

| ABSOLUTE STORAGE POSITION NUMBER | VIRTUAL STORAGE POSITION NUMBER | DISK PRESENCE/ ABSENCE INFORMATION |
|---|---|---|
| 1 | 1 | 0 (ABSENCE) |
| 2 | 2 | 0 (ABSENCE) |
| 3 | 3 | 0 (ABSENCE) |
| 4 | 4 | 0 (ABSENCE) |
| 5 | 5 | 0 (ABSENCE) |
| 6 | 6 | 0 (ABSENCE) |

FIG. 2 (b)

| ABSOLUTE STORAGE POSITION NUMBER | VIRTUAL STORAGE POSITION NUMBER | DISK PRESENCE/ ABSENCE INFORMATION |
|---|---|---|
| 1 | 4 | 1 (PRESENCE) |
| 2 | 6 | 0 (ABSENCE) |
| 3 | 1 | 1 (PRESENCE) |
| 4 | 3 | 0 (ABSENCE) |
| 5 | 2 | 1 (PRESENCE) |
| 6 | 5 | 1 (PRESENCE) |

| ABSOLUTE STORAGE POSITION NUMBER | DISK PRESENCE/ ABSENCE INFORMATION |
|---|---|
| 1 | 0 (ABSENCE) |
| 2 | 0 (ABSENCE) |
| 3 | 0 (ABSENCE) |
| 4 | 1 (PRESENCE) |
| 5 | 0 (ABSENCE) |
| 6 | 0 (ABSENCE) |

FIG. 13
PRIOR ART

RECORDING AND REPRODUCING APPARATUS CAPABLE OF DISPLAYING THE PRESENCE OR ABSENCE OF OPTICAL DISKS

BACKGROUND OF THE INVENTION

1. Field of the Invention

The present invention relates to a recording medium reproduction apparatus capable of housing a plurality of recording mediums.

2. Description of the Related Art

Figure 10:
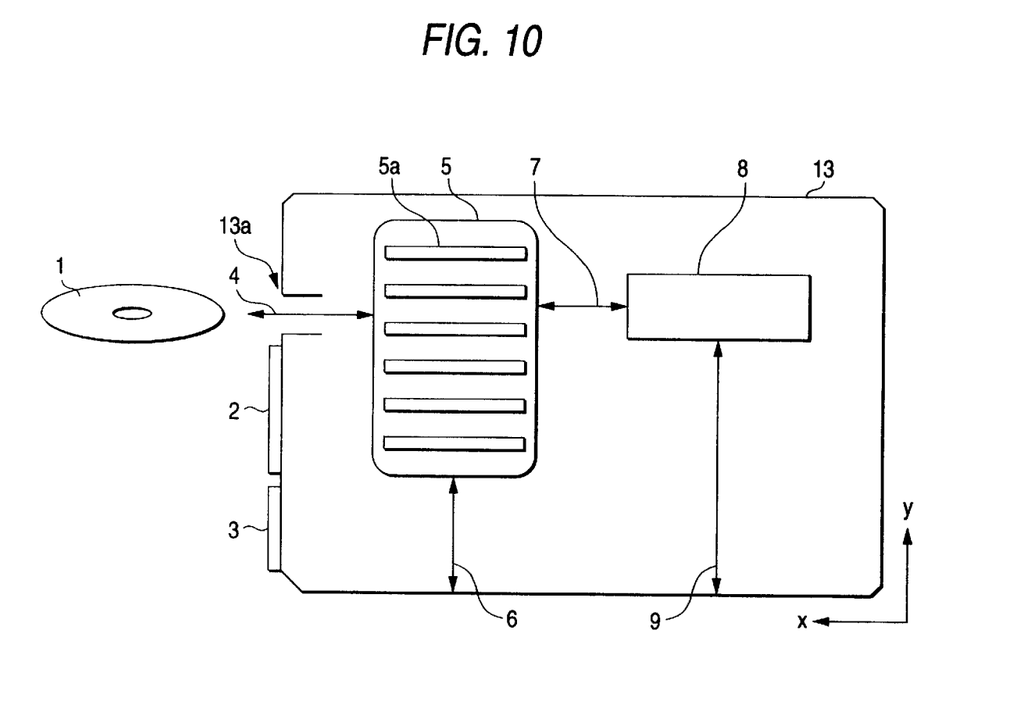
FIG. 10 is a structural view showing a recording medium reproduction apparatus shared between an example of an existing recording medium reproduction apparatus and a recording medium reproduction apparatus of the present invention.
Figure 11:
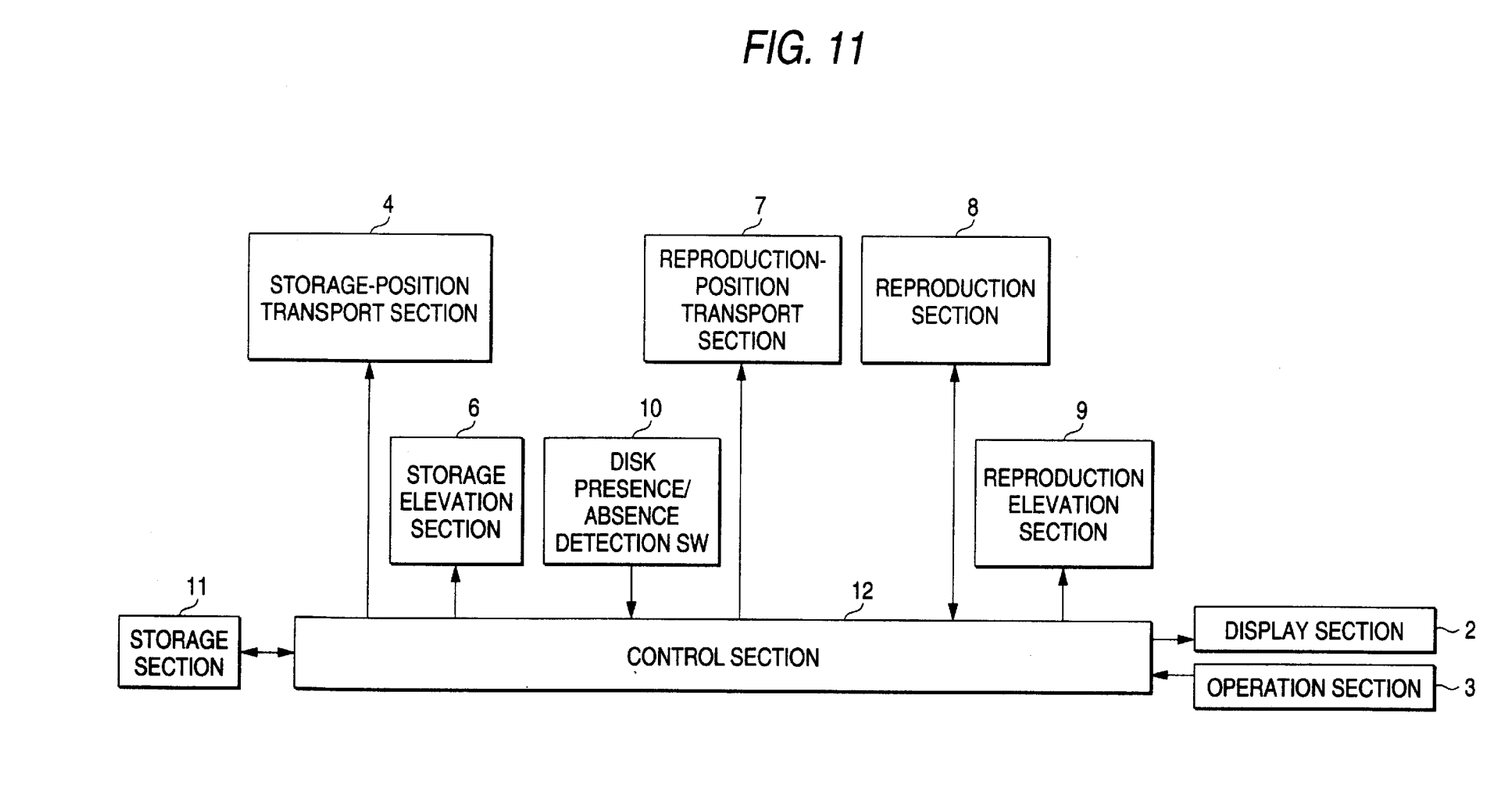
FIG. 11 is a block diagram showing the recording medium reproduction apparatus shared between the example of an existing recording medium reproduction apparatus and the recording medium reproduction apparatus of the present invention.
Figure 12:
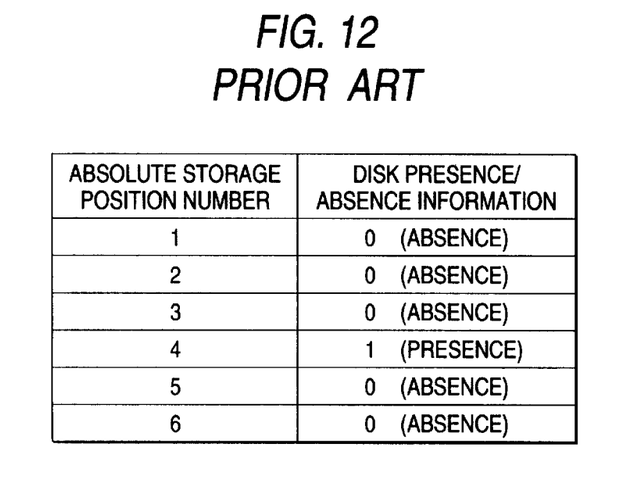
FIG. 12 is a diagram showing the structure of data which pertain to conventional position numbers and disk presence/absence information and are stored in memory.

A recording medium reproduction apparatus capable of housing a plurality of recording mediums will now be described while an in-car recording medium reproduction apparatus capable of housing a plurality of disks is taken as an example, with reference to a structural diagram shown in FIG. 10, a block diagram shown in FIG. 11, a representation which is shown in FIG. 12 and illustrates the structure of data stored in a memory, and a front view shown in FIG. 13.

A storage-position transport section 4 has a mechanism capable of moving a disk in direction "x" in order to insert a disk 1 into a storage section 5 from outside of a housing 13 by way of an insertion port 13a or to eject the disk 1 from the storage section 5 to the outside of the housing 13. The disk storage section 5 has a plurality of disk storage trays 5a, each capable of housing a single disk, and is provided within a housing 13 by way of a storage elevation section 6 for raising or lowering the disk storage section 5. The storage elevation section 6 moves the storage section 5 in direction "y", to thereby control the positions of the disk storage trays 5a housed in the storage section 5. As a result, a desired one is selected from the plurality of disk storage trays 5a housed in the storage section 5, and the thus-selected disk is placed in a predetermined position, thus enabling various operations, such as insertion or reproduction of the disk, as will be described later.

A reproduction-position transport section 7 is fixed to a reproduction section 8 and has a mechanism capable of moving the disk 1 between the storage section 5 and the reproduction section 8. The reproduction section 8 reads the data recorded on the disk 1 by means of rotating the disk 1 and is disposed within the housing 13 by way of a reproduction elevation section 9 which performs raising and lowering operations. The reproduction elevation section 9 moves, in direction "y", the reproduction position transport section 7 and the reproduction section 8 in an integrated manner, thus matching the reproduction transport section 7 and the reproduction section 8 in position with the storage section 5. In a case where a desired disk is to be selected and reproduced, the reproduction elevation section 9 and the storage elevation section 6 are actuated, thus rendering the reproduction section 8 level in direction "y" with the disk storage tray 5a having a desired disk stored therein. The reproduction-position transport section 7 that can be raised or lowered integrally with the reproduction section 8 takes the desired disk out of the disk storage tray 5a and transports the thus-selected disk to the reproduction section 8.

The storage elevation section 6 and the reproduction elevation section 9 are actuated in opposite directions so that the selected disk storage tray 5a and the reproduction section 8 come close to each other, thereby shortening access time required for selecting a disk as compared with that required in a case where only one of the storage elevator section 6 and the reproduction elevation section 9 is actuated.

Disk presence/absence detection SWs 10 are provided for the respective disk storage trays 5a and detect information about presence or absence of a disk in each of the disk storage trays 5a (hereinafter referred to as "disk presence/absence information") and transmits the information to a control section 12 The control section 12 stores the disk presence/absence information in a storage section 11 such that the disk presence/absence information corresponds to an absolute storage position number representing the physical position where the disk is stored (i.e., an absolute storage position). The absolute storage position number is assigned to each of the storage trays 5a, and the absolute storage position numbers are determined according to the heights of the respective storage trays 5a. For instance, provided that the absolute storage position number assigned to the storage tray 5a located at the highest position in the storage section 5 assumes the value 1, the values 2, 3, 4, . . . are assigned to the remaining storage trays 5a in accordance with the order in which the storage trays 5a are arranged. FIG. 12 shows an example structure of the data stored in the storage section 11.

Figure 13:
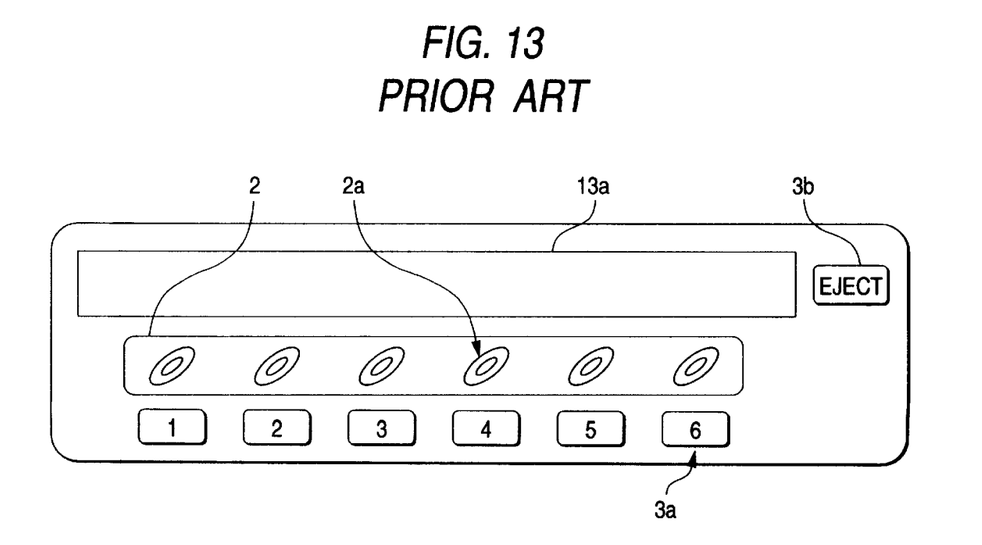
FIG. 13 is a front view showing an existing multi-disk reproduction apparatus.

On the basis of the previously-described disk presence/absence information, a disk presence/absence lamp 2a shown in FIG. 13 indicates the state of storage of the disk 1 in each of the absolute storage positions. As shown in FIG. 13, an operation section 3 has disk selection buttons 3a and a disk eject button 3b, the disk selection buttons 3a being equal in number to the number of disks. Each of the disk selection buttons 3a is labeled with an absolute storage position number and is arranged so as to correspond to the disk presence/absence information lamp 2a. Designation of an absolute storage position of a disk to be inserted, designation of a disk to be reproduced, or designation of a disk to be ejected is carried out by actuation of the corresponding one of the disk selection buttons 3a. Further, the disk eject button 3b instructs ejection of a designated disk.

The operation of the in-car recording medium reproduction apparatus required at the time of insertion of the disk 1 will now be described. First, an operator actuates any one of the disk selection buttons 3a assigned the absolute position numbers corresponding to the disk presence/absence information lamps 2a that indicate absence of a disk, thereby selecting the storage tray 5a assigned a desired absolute storage position. The control section 12 controls the storage elevation section 6, thus moving the thus-selected disk storage tray 5a to a position where a disk can be inserted into the tray (hereinafter referred to simply as a "disk-insertable position"). The insertion port 13a is now released from a locked state, thus enabling insertion of a disk. Subsequently, the storage-position transport section 4 holds the disk, which has been inserted by way of the insertion port 13a, and transports the disk to a disk storage tray 5a which in the previous operation had been arranged in the disk-insertable position. At this time, the disk presence/absence detection SW 10 provided for the disk storage tray 5a detects storage of a disk and transmits information about presence of a disk (hereinafter referred to simply as "disk-presence information") to the control section 12. As shown in FIG. 12, the control section 12 stores the disk-presence information into the storage section 11 so as to correspond to an absolute storage position number. Further, the control section 12 switches, from a dark state to an illuminated state, the disk presence/absence information lamp 2a corresponding to the absolute position number assigned to the disk storage tray 5a in which the disk has been inserted, in order to indicate insertion of the disk. Insertion of a disk is completed by way of the foregoing operations.

At the time of reproduction of the disk 1, the operator presses the appropriate one of the disk selection buttons 3a assigned the absolute position numbers corresponding to the disk presence/absence lamps 2a which indicate presence of a disk, to thereby designate the disk desired to be reproduced. The thus-designated disk is transported to the reproduction section 8 after lapse of a predetermined period of time, and the disk is reproduced by the reproduction section 8. A disk is ejected by actuation of the corresponding disk selection button 3a assigned the absolute storage position numbers corresponding to the disk presence/absence information lamps 2a which indicate presence of the disk, to thereby designate the disk to be ejected, and by means of issuing an instruction for ejecting the thus—designated disk by the operator pressing the disk eject button 3b before lapse of a predetermined period of time.

As mentioned above, since the existing recording medium reproduction apparatus does not allow removal of the disk storage section 5 from the housing 13, disks must be inserted into or ejected from the disk storage section 5 one by one by way of the insertion port 13a. For this reason, in a case where the positions of the disks that have already been stored in the disk storage section 5 are desired to be changed, the existing recording medium reproduction apparatus involves an operation of selecting a desired disk, ejecting the thus-selected disk, selecting another desired disk storage position, and inserting the disk into the thus-selected storage position. Therefore, in a case where there is a desire for changing storage positions of a large number of disks, ejection and insertion of a disk must be performed repeatedly, thereby complicating operations and increasing required labor. Particularly, in the case of an in-car recording medium reproduction apparatus whose control operations are performed in an environment where operation is difficult, insertion and ejection of a disk is laborious, consuming more time.

SUMMARY OF THE INVENTION

In order to solve the foregoing problem of the existing recording medium reproduction apparatus, the present invention provides a recording medium reproduction apparatus which houses a plurality of recording mediums and selectively reproduces an arbitrary recording medium from among the plurality of recording mediums, comprising: detection means for detecting information regarding the presence/absence of a recording medium in each of absolute storage positions where recording mediums are stored; assigning means for assigning to each of the absolute storage positions a virtual storage position number representing a virtual storage position; storage means for storing the virtual storage position numbers corresponding to the respective absolute storage positions and the information regarding the presence/absence of the recording medium corresponding to each of the absolute storage positions; and control means for controlling display means to display the information regarding the presence/absence of the recording medium so as to correspond to the virtual storage position number.

Further, the present invention provides a recording medium reproduction apparatus which houses a plurality of recording mediums and selectively reproduces an arbitrary recording medium from among the plurality of recording mediums, comprising: detection means for detecting information regarding the presence/absence of a recording medium in each of absolute storage positions where recording mediums are stored; assigning means for assigning to each of the absolute storage positions a virtual storage position number representing a virtual storage position; storage means for storing the virtual storage position numbers corresponding to the respective absolute storage positions and the information regarding the presence/absence of the recording medium corresponding to each of the absolute storage positions; display means for displaying the information regarding the presence/absence of a recording medium so as to correspond to a storage position number; control means for controlling the display means to display the information regarding the presence/absence of the recording medium so as to correspond to the virtual storage position number; and selection means which has a plurality of independent operation sections, each corresponding to one of the virtual storage position numbers, and selects one virtual storage position number from the virtual storage position numbers, wherein in a case where one of the operation sections is actuated, a recording medium corresponding to the thus-selected virtual storage position number is reproduced, and in a case where two different sections of the operation sections are actuated, the virtual storage positions assigned to the thus-selected operation sections are interchanged.

BRIEF DESCRIPTION OF THE DRAWINGS

FIGS. 5 (a) to 5 (c) are descriptive views showing a manual change control operation for interchanging virtual storage positions numbers according to the embodiment of the present invention;

DETAILED DESCRIPTION OF THE PREFERRED EMBODIMENT

A recording medium reproduction apparatus will be described hereinbelow as a preferred embodiment of the present invention with reference to the accompanying drawings. A first feature of the present invention lies in that a virtual storage position number representing a virtual storage position of a disk, as well as an absolute storage position number representing a physical storage position of a disk (i.e., an absolute storage position), are assigned to each of storage trays 5a. In contrast with the previously-described recording medium reproduction apparatus of the related art, the recording medium reproduction apparatus of the present invention is novel in terms of the data structure of a storage section 11 and the control operation performed by a control section 12. Since the recording medium reproduction apparatus of the present invention has the same interior mechanism and control blocks as those of the recording medium reproduction apparatus of the related art shown in FIGS. 10 and 11, their explanations are omitted here.

Figure 1:
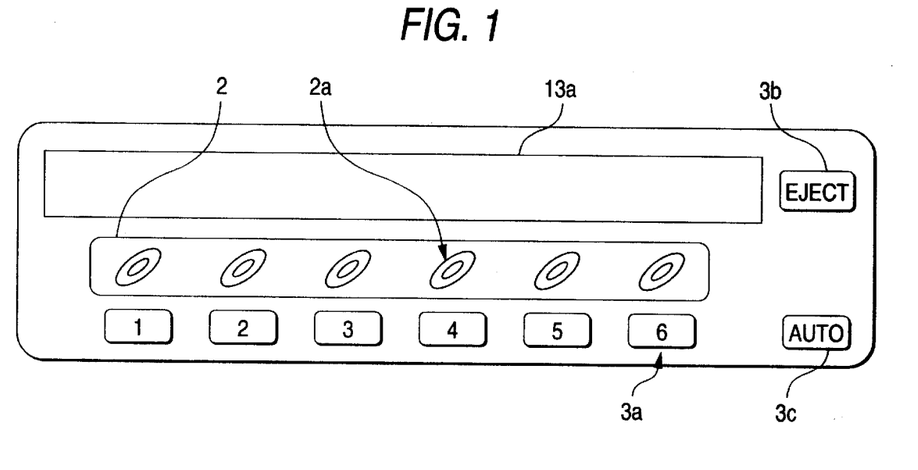
FIG. 1 is a front view showing a multi-disk reproduction apparatus of the present invention.
Figure 2:
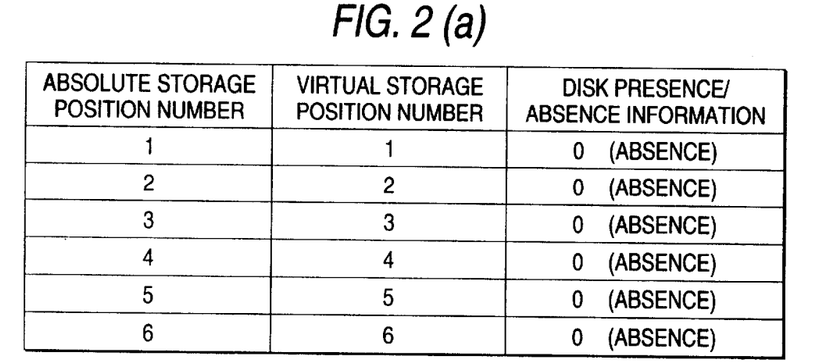
FIGS. 2(a) and 2(b) are illustrations showing the data structures of memory where storage position numbers and disk presence/absence information according to the present invention are stored.

FIG. 1 shows a front panel of a disk reproduction apparatus of the present invention. The disk reproduction apparatus differs from the recording medium reproduction apparatus of the related art shown in FIG. 13 in that the disk reproduction apparatus has an automatic change instruction button 3c. In other respects, the disk reproduction apparatus of the present invention is the same as the recording medium reproduction apparatus of the related art shown in FIG. 13. Here, the automatic change instruction button 3c is to be used for instructing automatic changing of storage positions of disks, which will be described later. FIGS. 2(a) and 2(b) show a data structure pertaining to information about the presence/absence of a disk (which will be hereinafter referred to as "disk presence/absence information") stored in a storage section 11, as well as a case where six disks 1 can be stored in a housing section 5. In the storage section 11 there are stored a virtual storage position number representing a virtual storage position and disk presence/absence information so as to correspond to an absolute storage position number which is associated with each of the respective disk storage trays 5a and represents a physical storage position of a disk. As a result, a virtual storage position number representing a virtual storage position is determined so as to correspond to the respective absolute storage position.

The virtual storage position number can be changed by the control section 12 at the time the storage position of the disk 1 is changed, in an operation which will be described later. The virtual storage position numbers correspond to all the absolute storage position numbers in a one-to-one relationship. A single virtual storage position number is appended to only a single absolute position number. When a disk is present, the disk presence/absence information is stored while assuming the value 1, and when no disk is present, the disk presence/absence information is stored while assuming the value 0. As shown in FIG. 2(a), in the initial state of the recording medium reproduction apparatus, the virtual storage position number is assigned the same value as is the absolute storage position number. As shown in FIG. 2(b), after the virtual storage positions are changed, in an operation which will be described later, the virtual storage position number allocated to the absolute storage position number is changed.

Next will be described a method by which the recording medium reproduction apparatus of the present invention displays disk presence/absence information and carries out various instructions. As mentioned previously, the disk presence/absence information is displayed so as to correspond to an appropriate virtual storage position number To this end, the control section 12 controls the display section 2 such that disk presence/absence information is displayed so as to correspond not to the absolute storage position number but to the virtual storage position number. Further, the control section 12 causes the numbers labeled on the respective disk selection buttons 3a to correspond not to the absolute storage position numbers but to the virtual storage position numbers.

For instance, as shown in FIG. 2(b), in a case where a disk is stored in a disk storage tray 5a assigned absolute storage position number 1 (i.e., in a case where a disk is present) and where a virtual storage position number is assigned the value 4, the control section 12 illuminates a disk presence/absence information lamp 2a corresponding to the disk selection button 3a labeled "4" (i.e., a disk presence/absence information lamp 2a adjoining the disk selection button 3a labeled "4"). Here, the operator perceives the numbers affixed to the respective disk selection buttons 3a as being the absolute storage position numbers corresponding to physical storage positions. In effect, in spite of the disk 1 being stored in the disk storage tray 5a assigned absolute storage position number 1 (the disk 1 is not stored in the disk storage tray 5a assigned absolute storage position number 4), it is possible to cause the operator to perceive the disk 1 as being stored in the disk storage tray 5a assigned absolute storage position number 4. In the event that a change arises in the disk presence/absence information as a result of ejection or insertion of the disk 1, the control section 12 updates the information stored in the storage section 11 by making an alteration thereto and, on the basis of the thus-altered disk presence/absence information, controls the disk presence/absence information lamps 2a provided within the display section 2.

Since the numbers affixed to the respective disk selection buttons 3a correspond to the virtual storage position numbers, the operator inputs an operation instruction, such as a reproduction instruction, as an instruction corresponding to a desired and selected virtual storage position number, with reference to the indication of the corresponding disk information presence/absence lamp 2a. A disk which is an object of instruction is stored not in the virtual storage position designated by the virtual storage position number but in the storage position designated by the absolute position number corresponding to the virtual position number. Therefore, the control section 12 ascertains the absolute storage position number corresponding to the virtual storage position number which has been taken as an object of instruction, with reference to the disk presence/absence information stored in the storage section 11, thus executing the input operation instruction with respect to the disk stored in the position designated by the thus-ascertained absolute storage position number.

Next will be described an operation for controlling changing of a disk storage position, which is a second feature of the recording medium reproduction apparatus of the present invention. As mentioned above, in the present invention, a virtual storage position number representing a virtual storage position is assigned to the absolute storage position of the disk 1, and disk presence/absence information corresponding to each of the respective virtual storage position numbers is displayed, to thereby cause the operator to perceive the disk presence/absence information regarding the virtual storage position as disk presence/absence information regarding the absolute storage position. Accordingly, if the virtual storage position numbers are assigned after having been changed, the operator can perceive such a change as if the real storage positions of disks had been changed. The present invention provides, as change control operations, two change control operations: that is, a manual change control operation for interchanging the storage positions of two disks selected by the operator, and an automatic change control operation for changing the storage positions of all disks in accordance with a certain rule. Next will be described these control operations.

First, a manual change control operation for interchanging storage positions of two disks will be described as a first example of changing of disk storage positions. A manual change control instruction is executed when the operator simultaneously presses any two buttons of the disk selection buttons 3a shown in FIG. 1. Here, in a case where any one of the disk selection buttons 3a is pressed, an instruction for reproduction, insertion, or ejection is performed, as in the case of the recording medium reproduction apparatus of the related art. To this end, the recording medium reproduction apparatus performs a control operation for determining an input instruction. The determination operation will now be described with reference to FIG. 3.

Figure 3:
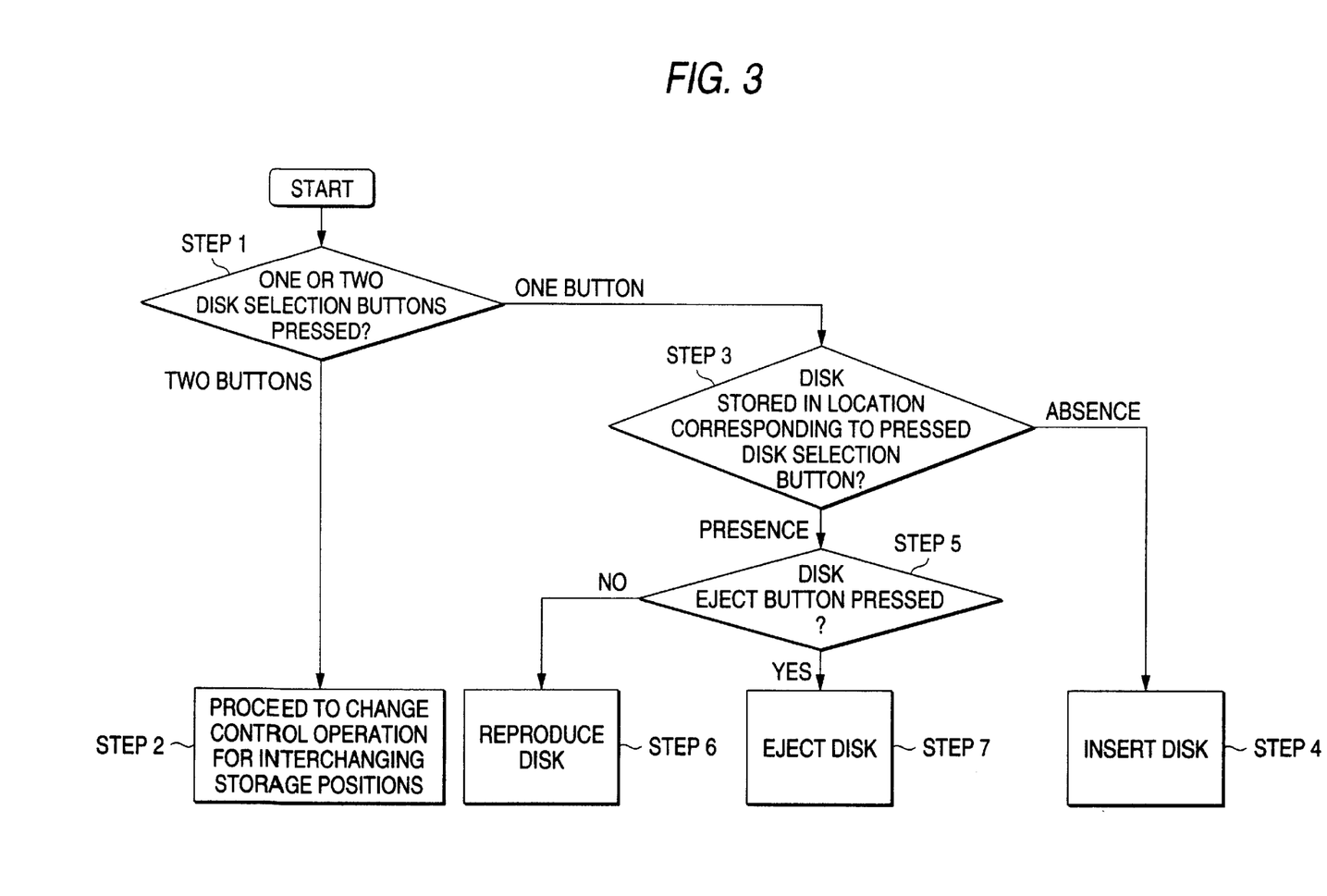
FIG. 3 is a flowchart showing a method of controlling a button having a plurality of operation functions according to the present invention.

When the disk selection buttons 3a are actuated, the control section 12 determines whether one disk selection button 3a or two disk selection buttons 3a have been pressed (step 1). Specifically, time is counted from detection of actuation of anyone of the disk selection buttons 3a. If actuation of another one of the disk selection buttons 3a is not detected within a predetermined period of time, the control section 12 determines that one disk selection button 3a has been actuated. In contrast, in a case where actuation of another disk selection buttons 3a is detected within a predetermined period of time and where the input entered by way of the first-actuated disk selection button 3a continues, the control section 12 determines that two disk selection buttons 3a have been actuated simultaneously. When two disk selection buttons 3a are determined to be pressed, processing proceeds to a control operation for changing storage positions to be described later; that is, a manual change control operation (step 2). In contrast, if a single disk selection button 3a is determined to have been pressed, a determination is made as to whether or not a disk is stored in a virtual storage position corresponding to the thus-actuated disk selection button 3a (step 3). If no disk is stored, a disk is inserted into the absolute storage position corresponding to the thus-selected virtual storage position number (step 4). In contrast, if a disk is stored, a determination is made as to whether or not the disk eject button 3b has been actuated (step 5). If the disk eject button 3b has not yet been actuated, the selected disk is reproduced (step 6). In contrast, if the disk eject button 3b has been actuated, the selected disk is ejected (step 7).

By means of the above-described control operations, four types of operations; that is, insertion, reproduction, ejection, and manual changing of the disk 1, can be selectively effected by use of one type of button. With regard to designing of an apparatus whose housing is limited in size, such as an in-car recording medium reproduction apparatus of 1 DIN (Deutsches-Industrie-Norm) size, the area of the operation section 3 and that of the display section 2 can be reduced, thus rendering the recording medium reproduction apparatus compact.

Figure 4:
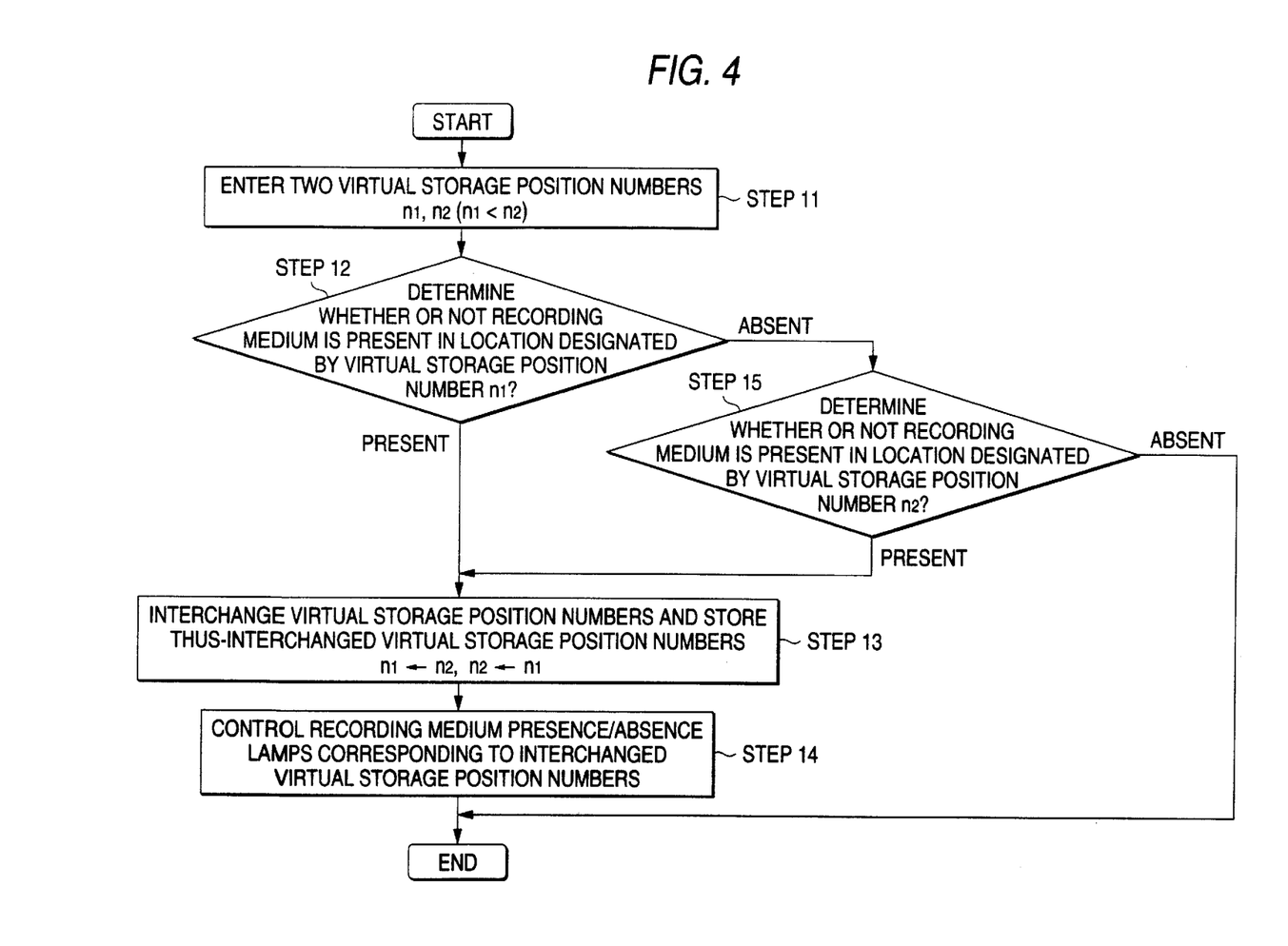
FIG. 4 is a flowchart showing a manual change control operation for interchanging virtual storage position numbers according to one embodiment of the present invention.

Next will be described an internal control operation to be performed by the control section 12 at the time of a manual change control operation being performed, with reference to FIG. 4. When processing proceeds to a manual change control operation by way of a determination operation shown in FIG. 3, two virtual storage position numbers to be interchanged have already been input to the control section 12 (step 11). Subsequently, the control section 12 determines whether or not a disk is stored in the location designated by the lower of the thus-input two virtual storage position numbers (step 12). If the disk is determined to be stored in the location, processing proceeds to step 13. In contrast, if the disk is determined not to be stored in the location, processing proceeds to step 15. In step 15, the control section 12 determines whether or not a disk is stored in the location designated by the higher of the two virtual storage position numbers. If a disk is determined to be stored, processing proceeds to step 13. In contrast, if a disk is determined not to be stored, processing is terminated.

In a case where no disk is found in any of the locations designated by the two input virtual storage position numbers, processing is terminated without execution of a control operation for interchanging virtual storage position numbers. In a case where a disk is stored in the location designated by either of the two virtual storage position numbers, the control section 12 interchanges the thus-input two virtual storage position numbers and stores the thus-changed virtual storage position numbers into the storage section 11 in accordance with a data structure shown in FIGS. 2(a) and 2(b) (step 13). Further, the control section 12 controls the disk presence/absence information lamps 2a provided within the display section 2 in accordance with the thus-interchanged virtual storage position numbers (step 14). By means of only the above-described internal control operation performed by the control section 12 with use of the virtual storage position number, the operator can perceive the storage positions as if the storage positions of the disks (i.e., the absolute storage positions) had been interchanged.

Figure 5:
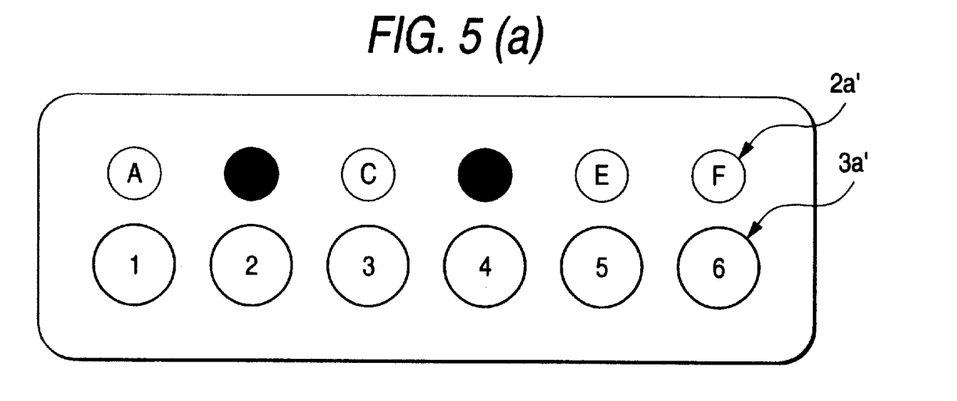

There will now be provided an explanation of a case where a manual change control operation is actually performed, with reference to FIG. 5. FIG. 5 shows the state of operation of the recording medium reproduction apparatus. A circular sign assigned 2a' corresponds to the disk presence/absence information lamp 2a, and a circular sign assigned 3a' corresponds to the disk selection button 3a. A numeral provided in the circular sign 3a' is identical with the number affixed to the disk selection button 3a. If the circular sign 2a' is not opaque, a disk is stored in the location corresponding to the circular sign 2a'. In contrast, if the circular sign 2a' is opaque, no disk is stored in the corresponding location. The letter provided within the circular sign 2a' is a symbol denoting the type of disk actually stored.

A first example corresponds to a case in which there are interchanged a disk 1 stored in virtual storage position number 1 and a disk 1 stored in virtual storage position number 3, both being shown in FIG. 5(a). When virtual storage position numbers 1 and 3 are input by way of the operation section 3, the control section 12 determines whether or not a disk is stored in the location designated by virtual storage position number 1. After having ascertained presence of disk A, the control section 12 changes the virtual storage position number assigned to disk A from 1 to 3, and changes the virtual storage position number assigned to disk C from 3 to 1. The control section 12 stores the virtual storage position numbers, which have been updated in response to the change, into the storage section 11 and controls the disk presence/absence information lamps 2a such that disk presence/absence information is displayed so as to correspond to the thus-updated virtual storage position numbers. As a result, the disk presence/absence information lamps 2a are indicated, as shown in FIG. 5(b). In the case, since disks are stored in the respective locations designated by the two virtual storage positions to be interchanged, the indication of the disk presence/absence information lamps 2a remains unchanged. However, the disks stored in the locations corresponding to the storage position numbers 1 and 3 affixed to the disk selection buttons 3a have been interchanged.

A second example corresponds to a case in which there are interchanged a disk 1 stored in the location designated by virtual storage position number 2 and a disk 1 stored in the location designated by virtual storage position number 6, both being shown in FIG. 5(b). As in the case of the first example, when virtual storage position numbers 2 and 6 are entered by way of the operation section 3, the control section 12 determines whether or not a disk is stored in the location designated by virtual storage position number 2. Since no disk is stored in the location designated by virtual storage position number 2, the control section 12 then determines whether or not a disk is stored in the location designated by virtual storage position number 6. After having ascertained presence of disk F, the control section 12 changes the virtual storage position number assigned to disk F from 6 to 2 and changes the virtual storage position number to the location where no disk is stored from 2 to 6. The control section 12 stores the virtual storage position numbers, which have been updated in response to the change, into the storage section 11 and controls the disk presence/absence information lamps 2a such that disk presence/absence information is displayed so as to correspond to the thus-updated virtual storage position numbers. As a result, the disk presence/absence information lamps 2a are indicated, as shown in FIG. 5(c).

A third example corresponds to a case in which there are interchanged a disk 1 stored in virtual storage position number 2 and a disk 1 stored in virtual storage position number 4, both being shown in FIG. 5(b). As in the case of the previous examples, the control section 12 makes a determination as to whether or not a disk is stored in the location designated by virtual storage position number 2, and then makes a determination whether a disk is stored in the location designated by virtual position number 4. Since no disk is determined to be stored in either of the locations, processing is terminated without interchanging the virtual storage position numbers.

An example application of the foregoing manual change control operation will now be described with reference to FIGS. 6(a) to 6(c) and FIGS. 7(a) and 7(b). Like FIGS. 5(a) to 5(c), these drawings show the state of operation of the recording medium reproduction apparatus. Katakana (square Japanese syllabary) characters provided in respective circular signs 2a' denote disks containing Japanese music, whilst Roman alphabetic characters provided in circular signs 2a' denote disks containing European music.

Figure 6:
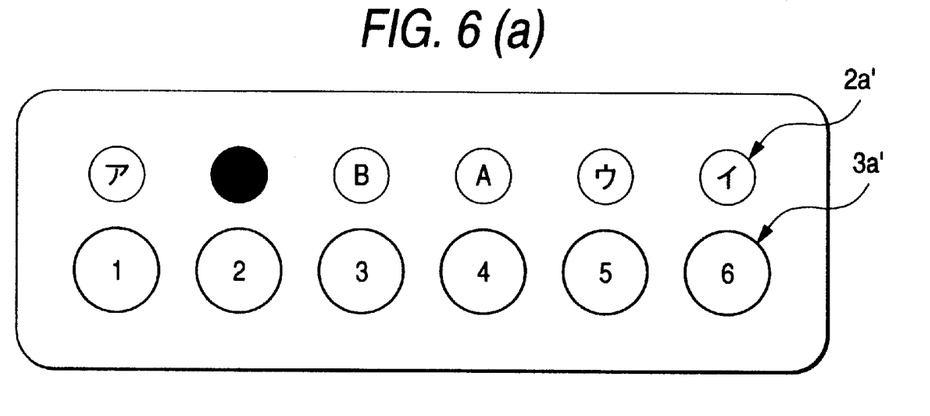
FIGS. 6(a) to 6(c) are first descriptive views showing an application which utilizes the manual change control operation for interchanging virtual storage position numbers according to the embodiment of the present invention.

As shown in FIGS. 6(a) to 6(c), a first application of manual change control operation corresponds to a case where a plurality of disks 1 housed in the recording medium reproduction apparatus are rearranged into desired groups according to; for example, artists or categories, by means of a manual change control operation. In a case where the plurality of disks housed in such a state as shown in FIG. 6(a) are to be rearranged into two groups: that is, a Japanese music group and an European music group, the disk stored in the location designated by virtual storage position number 2 and the disk stored in the location designated by virtual storage position number 6 are interchanged by means of the manual change control operation. Similarly, the disk stored in the location designated by virtual storage position number 3 and the disk stored in the location designated by the virtual storage position number 5 are interchanged. As a result, the disks are divided into the Japanese music group and the European music group, as shown in FIG. 6(b).

Further, virtual storage position numbers 4 and 6 are interchanged, thereby shifting the location where no disk is available to a position between the Japanese music group and the European music group. As shown in FIG. 6(c), groups can be separated from each other while the virtual storage position number assigned no disk is used as a boundary marker, thus rendering the boundary between groups readily visual.

FIGS. 7(a) and 7(b) show a second application of manual change control operation, wherein three or more disks 1 are sequentially and selectively interchanged. In this example, when the operator sequentially selects three or more disks desired to be interchanged, there is performed a change operation such that virtual storage position numbers are assigned to the thus-selected disks in the sequence in which the disks are selected.

Figure 7:
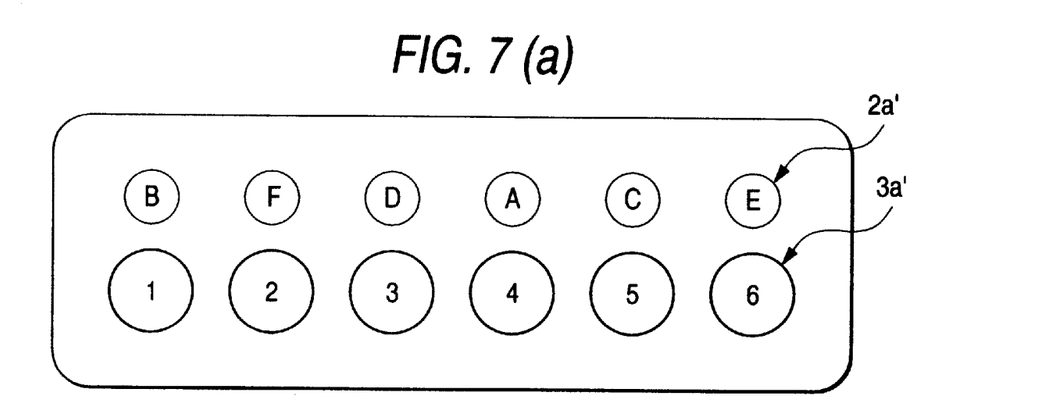
FIGS. 7(a) and 7(b) are second descriptive views showing an application which utilizes the manual change control operation for interchanging virtual storage position numbers according to the embodiment of the present invention.

For instance, in a case where virtual storage position numbers are rearranged such that disks A to F are arranged in sequence from virtual storage position number 1 to virtual storage position number 6, as shown in FIG. 7 (b), the operator selects a manual change control operation mode for changing the positions of three or more disks, by actuation of unillustrated control buttons. Next, the operator actuates the control buttons 3a' in sequence of 4, 1, 5, 3, 6, and 2, to thereby input disks desired to be interchanged in sequence in which the disks are to be interchanged. After completion of entry of the disks, the control section 12 assigns virtual storage position numbers to the thus-input disks in ascending order, in accordance with the sequence in which the disks have been selected, and rewrites the data stored in the storage section 11. Further, the control section 12 controls the disk presence/absence information lamps 2a in accordance with the newly-assigned virtual storage position numbers. By means of the foregoing selective change operation, the operator can interchange three or more disks through simple operation, thus greatly shortening the time required for interchanging operations.

In the previously-described examples of manual change control operation, the data pertaining to the immediately-preceding virtual storage position numbers are deleted from the storage section 11 when new virtual storage position numbers are assigned to disks by means of an input operation performed by the operator. However, so long as the data pertaining to the immediately-preceding virtual storage position numbers remain stored even after new virtual storage position numbers have been assigned to disks, the immediately-preceding position number can be assigned quickly even if the operator erroneously enters an erroneous virtual storage position number. Alternatively, the disk selection button 3a which has been actuated by the operator at the time of a manual change control operation may be made to blink for several seconds, to thereby allow the operator to ascertain his operation.

In the examples in which virtual storage position numbers are interchanged, virtual storage position numbers are selected by actuation of the disk selection buttons 3a corresponding to a plurality of respective recording mediums. However, virtual storage position numbers may be selected and designated by means of ten keys or a jog dial.

Figure 8:
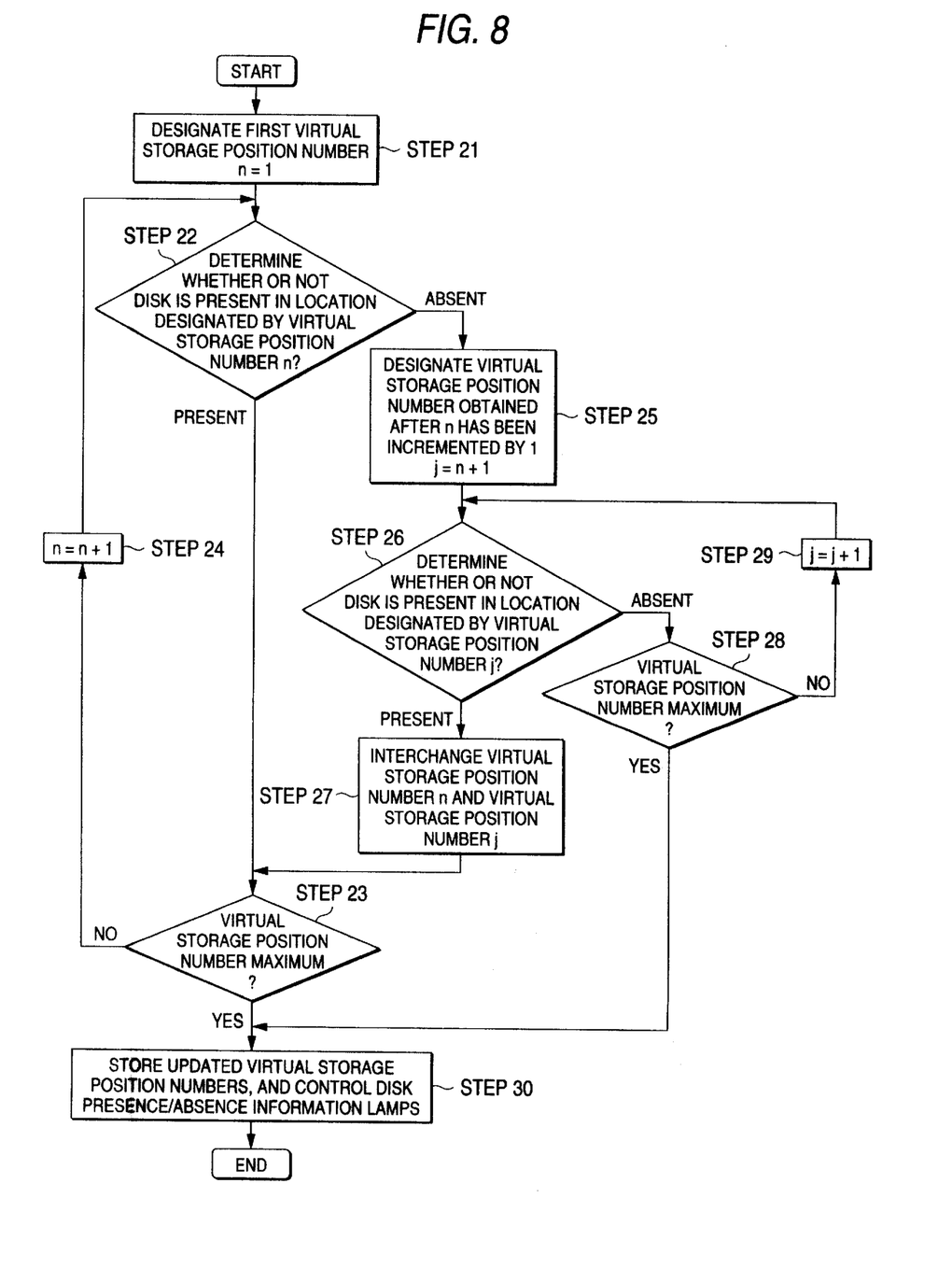
FIG. 8 is a flowchart showing an automatic change operation for interchanging virtual storage position numbers according to the embodiment of the present invention.
Figure 9:
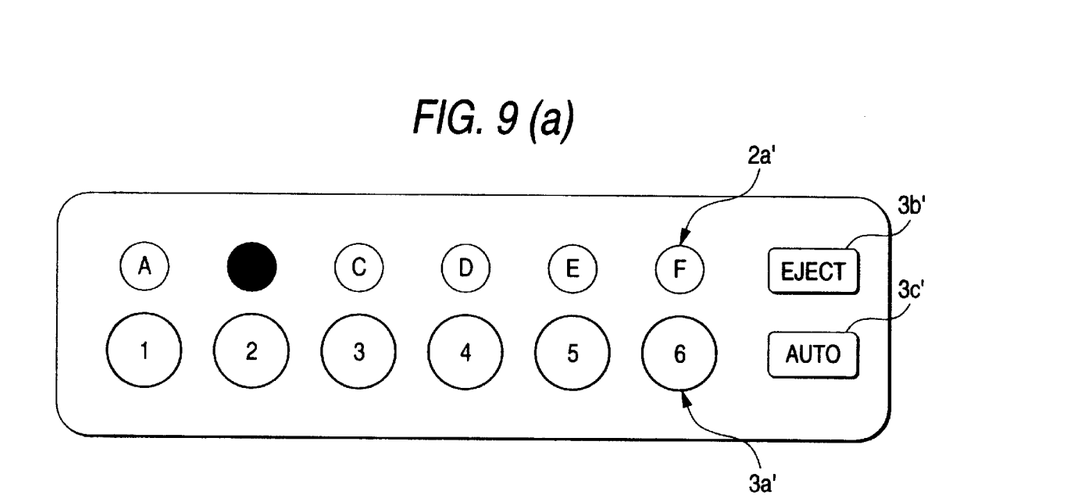
FIGS. 9(a) and 9(b) are descriptive views showing the automatic change operation for interchanging virtual storage position numbers according to the embodiment of the present invention.

With reference to FIG. 8 and FIGS. 9(a) and 9(b), there will now be described, as a second example of a change control operation for interchanging storage positions of disks 1, an automatic change operation for automatically interchanging a virtual storage position where a disk is stored and another virtual storage position where no disk is stored. FIG. 8 shows a control operation to be performed by the control section 12 when an automatic change operation is performed, and FIGS. 9(a) and 9(b) illustrate the operation of the recording medium reproduction apparatus, as do FIGS. 5(a) to 5(c). In the automatic change operation of the present example, disk presence/absence information items indicating presence of a disk are continually arranged in ascending order from the lowest virtual storage position number. The operator can perceive disks as if they were sequentially stored in ascending order from the lowest virtual storage position number. In a case where the operator performs an automatic change operation while disks are stored in virtual storage position 1 and virtual storage positions 3 through 6, as shown in FIG. 9(a), the disk stored in virtual storage position 3 is shifted to virtual storage position 2. Similarly, the successive disks are shifted from their virtual storage positions: from 4 to 3, from 5 to 4, and from 6 to 5 As a result, as shown in FIG. 9(b), the disks are sequentially stored in virtual storage positions 1 to 5. Next will be described a control operation to be performed by the control section 12 at the time of an automatic change operation of the present example being performed, with reference to FIG. 8.

In step 21, upon detection of actuation of the automatic change instruction button 3c shown in FIG. 1 for instructing execution of an automatic change operation, the control section 21 designates the first virtual storage position number; that is, n=1. In step 22, the control section 12 determines whether or not a disk is stored in the location designated by virtual storage position number "n". If a disk is stored, processing proceeds to step 23. In contrast, if no disk is stored, processing proceeds to step 25. In step 23, the control section 12 determines whether or not the virtual storage position number "n" is the maximum value. If YES is selected in step 23, processing proceeds to step 30. In contrast, if NO is selected, processing proceeds to step 24, where the control section 12 increments "n" by 1 (i e., performs the operation n=n+1), and returns to step 22. In step 30, the control section 12 stores the virtual storage position numbers, which have been updated, into the storage section 11. Further, the control section 12 controls the disk presence/absence information lamps 2a in accordance with the thus-updated virtual storage position numbers and terminates processing.

The control section 12 performs the operation j=n+1 in step 25 and determines, in step 26, whether or not disk 1 is stored in virtual storage position number "j". If a disk 1 is stored, processing proceeds to step 27. In contrast, if no disk is stored, processing proceeds to step 28. In step 27, the control section 12 interchanges virtual storage position number "n" and virtual storage position number "j", and processing proceeds to step 23. Further, in step 28 the control section 12 determines whether or not virtual storage position number "j" is the maximum value. If YES is selected in step 28, processing is terminated. In contrast, if NO is selected in step 28, processing proceeds to step 29. In step 29 the control section 12 increments "j" by 1 (i.e., performs the operation j=j+1), and processing returns to step 26. As a result of the control section 12 performing the foregoing processing operations, the operator can continually arrange disks 1 in ascending order from the virtual storage position assigned the lowest virtual storage position number without performing manual change control operations a plurality of times, by pressing the automatic change instruction button 3c only once.

In a case where the control section 12 has ascertained that a disk 1 is not stored in any one of the locations assigned the virtual storage position numbers, the control section 12 terminates processing without performing processing operations pertaining to step 21 and subsequent steps. In the above-described example of automatic change operation, storage positions of disks are changed such that disk presence/absence information items indicating presence of a disk are continually arranged in ascending order from the lowest virtual storage position number. However, the present invention is not limited to such an example. The present invention may be embodied in various manners, so long as storage positions of disks are changed such that all the disk presence/absence information items corresponding to a group of consecutive virtual storage position numbers are taken as storing disks and such that all the disk presence/ absence information items corresponding to another group of consecutive virtual storage position numbers other than those included in the group are taken as not storing disks.

In the previous examples, the present invention has been described with reference to an apparatus which does not include means for indicating information unique to a disk, such as the title of a disk. However, the present invention may also be applied to an apparatus having means for indicating information unique to a disk.

As has been described above, the present invention provides a recording medium reproduction apparatus which can house a plurality of recording mediums and selectively reproduce an arbitrary recording medium from among the plurality of recording mediums, comprising: detection means for detecting information regarding the presence/ absence of a recording medium in each of absolute storage positions where recording mediums are stored; assigning means for assigning to each of the absolute storage positions a virtual storage position number representing a virtual storage position; storage means for storing the virtual storage position numbers corresponding to the respective absolute storage positions and the information regarding the presence/absence of the recording medium corresponding to each of the absolute storage positions; and control means for controlling display means to display the information regarding the presence/absence of the recording medium so as to correspond to the virtual storage position number. The operator can virtually change storage positions of disks without involvement of physical interchanging of storage positions of the disks, which would require repeated ejection or insertion of disks. Accordingly, the operator can significantly diminish labor required for changing storage positions of disks and operation time required for the labor.

What is claimed is:

1. A recording medium reproduction apparatus which houses a plurality of recording mediums and selectively reproduces an arbitrary recording medium from among the plurality of recording mediums, comprising:

detection means for detecting existence information indicating whether or not a recording medium exists in each of absolute storage positions where recording mediums are stored;

assigning means for assigning to each of the absolute storage positions a virtual storage position number representing a virtual storage position;

storage means for storing the virtual storage position numbers corresponding to the respective absolute storage positions and the existence information; and control means for controlling display means to display the existence information so as to correspond to the virtual storage position number.

2. The recording medium reproduction apparatus as defined in claim 1, further comprising:
selection means for selecting the virtual storage position number; and
change processing means which, when the selection means selects at least two virtual storage position numbers, interchanges the selected virtual storage position numbers.

3. The recording medium reproduction apparatus as defined in claim 2, wherein the change processing means causes the existence information indicating a presence of a recording medium to correspond to a group of consecutive virtual storage position numbers, while causing the existence information indicating an absence of a recording medium to correspond to the virtual storage position numbers besides the virtual storage position numbers included in the group.

4. The recording medium reproduction apparatus as defined in claim 2, wherein, when no recording mediums are stored in the absolute storage positions corresponding to the selected virtual storage position numbers, processing of the change processing means is inhibited.

5. A recording medium reproduction apparatus which houses a plurality of recording mediums and selectively reproduces an arbitrary recording medium from among the plurality of recording mediums, comprising:
detection means for detecting existence information indicating whether or not a recording medium exists in each of absolute storage positions where recording mediums are stored;
assigning means for assigning to each of the absolute storage positions a virtual storage position number representing a virtual storage position;
storage means for storing the virtual storage position numbers corresponding to the respective absolute storage positions and the existence information;
display means for displaying the existence information so as to correspond to a storage position number;
control means for controlling the display means to display the existence information so as to correspond to the virtual storage position number; and
selection means which has a plurality of independent operation sections, each corresponding to one of the virtual storage position numbers, and selects one virtual storage position number from the virtual storage position numbers,
wherein, when one of the operation sections is actuated, a recording medium corresponding to the selected virtual storage position number is reproduced, and when two different sections of the operation sections are actuated, the virtual storage positions assigned to the selected operation sections are interchanged.

6. The recording medium reproduction apparatus as defined in claim 5, wherein the selection means simultaneously selects two virtual storage position numbers by way of the two different operation sections.

7. An apparatus which houses a plurality of recording mediums and selectively reproduces an arbitrary recording medium from among the plurality of recording mediums, comprising:
a detector that detects existence information indicating whether or not a recording medium exists in absolute storage positions where recording mediums are stored;
an assigning unit that assigns a virtual storage position number representing a virtual storage position to the absolute storage positions;
a memory that stores the virtual storage position numbers corresponding to the respective absolute storage positions and the existence information; and
a controller that controls the display to display the existence information so as to correspond to the virtual storage position number.

8. The apparatus as defined in claim 7, further comprising:
a selector that selects the virtual storage position number; and
a processor, wherein when the selector selects at least two virtual storage position numbers, the processor interchanges the selected virtual storage position numbers.

9. The apparatus as defined in claim 8, wherein the processor causes the existence information, which indicates a presence of a recording medium, to correspond to a group of consecutive virtual storage position numbers, and
wherein the processor causes the existence information, which indicates an absence of a recording medium, to correspond to the virtual storage position numbers besides the virtual storage position numbers included in the group.

10. The apparatus as defined in claim 8, wherein, when no recording mediums are stored in the absolute storage positions corresponding to the selected virtual storage position numbers, processing of the processor is inhibited.

11. An apparatus which houses a plurality of recording mediums and selectively reproduces an arbitrary recording medium from among the plurality of recording mediums, comprising:
a detector that detects existence information indicating whether or not a recording medium exists in absolute storage positions where recording mediums are stored;
an assigning unit that assigns a virtual storage position number representing a virtual storage position to the absolute storage positions;
a memory that stores the virtual storage position numbers corresponding to the respective absolute storage positions and the existence information;
a display that displays the existence information so as to correspond to a storage position number;
a controller that controls the display to display the existence information so as to correspond to the virtual storage position number; and
a selector which has a plurality of independent operation sections, each corresponding to one of the virtual storage position numbers, and which selects one virtual storage position number from the virtual storage position numbers,
wherein, when one of the operation sections is actuated, a recording medium corresponding to the selected virtual storage position number is reproduced, and when two different sections of the operation sections are actuated, the virtual storage positions assigned to the selected operation sections are interchanged.

12. The apparatus as defined in claim 11, wherein the selector simultaneously selects two virtual storage position numbers by way of the two different operation sections.

13. A method, comprising:
(a) detecting existence information indicating whether or not a recording medium exists in absolute storage positions where recording mediums are stored;
(b) assigning virtual storage position numbers representing virtual storage positions to the absolute storage positions;
(c) storing the virtual storage position numbers corresponding to the respective absolute storage positions and the existence information; and (d) displaying the existence information so as to correspond to the virtual storage position numbers.

14. The method as defined in claim 13, further comprising:
   (e) selecting at least one virtual storage position number; and
   (f) when at least two virtual storage position numbers are selected, interchanging the selected virtual storage position numbers.

15. The method as defined in claim 14, wherein said operation (f) comprises:
   (f1) causing the existence information, which indicates a presence of a recording medium, to correspond to a group of consecutive virtual storage position numbers, and
   (f2) causing the existence information, which indicates an absence of a recording medium, to correspond to the virtual storage position numbers besides the virtual storage position numbers included in the group.

16. A method, comprising:
   (a) detecting existence information indicating whether or not a recording medium exists in absolute storage positions where recording mediums are stored;
   (b) assigning virtual storage position numbers representing virtual storage positions to the absolute storage positions;
   (c) storing the virtual storage position numbers corresponding to the respective absolute storage positions and the existence information;
   (d) displaying the existence information so as to correspond to the virtual storage position numbers;
   (e) selecting at least one virtual storage position number from the virtual storage position numbers via a plurality of independent operation sections, each corresponding to one of the virtual storage position numbers;
   (f) when one of the operation sections is actuated, reproducing a recording medium corresponding to the selected virtual storage position number; and
   (g) when two different sections of the operation sections are actuated, interchanging the virtual storage positions assigned to the selected operation sections.

* * * * *